United States Patent [19]
Reuman

[11] Patent Number: 6,069,982
[45] Date of Patent: May 30, 2000

[54] ESTIMATION OF FREQUENCY DEPENDENCE AND GREY-LEVEL DEPENDENCE OF NOISE IN AN IMAGE

[75] Inventor: Steven R. Reuman, Acton, Mass.

[73] Assignee: Polaroid Corporation, Cambridge, Mass.

[21] Appl. No.: 08/996,810

[22] Filed: Dec. 23, 1997

[51] Int. Cl.⁷ .................................................. G06K 9/40
[52] U.S. Cl. ......................... 382/275; 382/254; 358/463
[58] Field of Search .................................. 382/254, 260, 382/263, 264, 275, 276, 283, 168, 171; 358/447, 463, 517, 522, 523

[56] References Cited

U.S. PATENT DOCUMENTS

| | | | |
|---|---|---|---|
| 5,440,366 | 8/1995 | Reiss et al. . | |
| 5,809,178 | 9/1998 | Anderson et al. | 358/463 |
| 5,946,413 | 8/1999 | Shibata et al. | 382/264 |
| 5,974,193 | 9/1998 | Baudouin | 382/263 |

OTHER PUBLICATIONS

Chehdi K: "An Approach to the Automatic Filtering of Images", Signal Processing Theories and Applications, Brussels, 1992, vol. 3, Aug. 24, 1992, pp. 1409–1412.

Lagendijk R L et al.: Recursive and interative methods for image identification and restoration, Signal Processing Theories and Applications, Grenoble, vol. 1 Sep. 5, 1988, pp. 235–238.

Chehdi K; "Automatic identification of noises ofr an optimal filtering," Proceedings of the Pacific Rim Conference on Communications, Comput and Signal Processing, Victoria, vol. 2, May 19, 1993, pp. 474–477.

U.S. Patent Application No. 08/440,639 filed May 15, 1995 by Wober et al.

U.S. Patent Application No. 08/966,140 filed Nov. 7, 1997 by Wober et al.

U.S. Patent Application No. 08/709,487 filed Sep. 6, 1996 by Hultgren et al.

International Color Consortium Profile format Specification, Version 3.3, Nov. 11, 1996.

Numerical Recipes in C by Press et al., Second Edition, Cambridge University Press, (1992) pp. 592–595.

*Primary Examiner*—Thomas D. Lee
*Attorney, Agent, or Firm*—Barry Gaiman; Donald F. Mofford

[57] ABSTRACT

Estimating spatial noise characteristics associated with an image acquired from an unknown digital image acquisition device is accomplished by a method, or system, which: provides predetermined default spatial noise characteristic information of the unknown digital image acquisition device; gathers user information related to the spatial noise characteristics of the unknown digital image acquisition device; gathers, from the acquired image, image data related to the spatial noise characteristics of the unknown digital image acquisition device; generates replacement data in response to the user information and the image data; and updates the predetermined default spatial noise characteristic information with the replacement data.

28 Claims, 8 Drawing Sheets

ESTIMATION OF FREQUENCY DEPENDENCE AND GREY-LEVEL DEPENDENCE OF NOISE IN AN IMAGE

BACKGROUND OF THE INVENTION

The present invention is directed generally towards a digital image processing system and method for estimating the frequency dependence and grey-level dependence of noise introduced by an image source device and, more particularly, for generating a spatial device profile describing the noise introduced by the source device.

Here, an input "device" may be a piece of hardware such as a scanner or camera, but may also be any abstract input device: a processing module of an image processing system that receives an image, transforms it in some way with the possible generation or propagation of noise, and outputs it. Any such abstract device has color characteristics—point transformations of input values (say, rgb triplets) occurring in the device—as well as spatial characteristics—device transformations where each value in the output image may depend on a neighborhood of nearby points in the input image.

Device color characteristics

One common technique for associating color characteristic information with a particular device is through the use of a color profile. A device color profile is standardized and defined as "a digital representation of the relation between device coordinates and a device-independent specification of color" in the International Color Consortium (ICC) Profile Format Specification, Version 3.3, Nov. 11, 1996, page 101 incorporated by reference herein in its entirety for supplemental background information which is non-essential but helpful in appreciating the applications of the present invention.

The ICC defines five major classes of color profile: device profile, device-link profile, color space conversion profile, abstract profile and named color profile. Device profiles are further broken down into subclasses of input profiles, output profiles and display profiles. The ICC profile is a tagged file structure which includes three main sections: a header, a tag table and tagged element data. From the profile header, a color management system (CMS) obtains and operates on general device information, file information and profile information.

Device spatial characteristics

Spatial characteristics of the elements of an image processing system can be represented by spatial characteristic functions describing noise and image signal transform characteristics of the device under consideration. In practice these image signal transform characteristics are represented by mid-tone Wiener Noise Spectra (WNS), small signal modulation transfer functions (MTF) measured in mid-tone grey-levels, and LUTS describing how noise variance changes as a function of grey-level. The WNS can be represented as a one-dimensional vector, describing how noise power changes as a function of spatial frequency in one dimension, or as a two-dimensional matrix, describing how noise power changes as a function of spatial frequency in two dimensions. A two-dimensional noise power matrix may be referred to as a "noise mask" in this application. U.S. patent application Ser. No. 08/440,639 filed May 15, 1995 for noise reduction using a Wiener variant filter in a pyramid image is hereby incorporated by reference in its entirety to provide supplemental background information which is non-essential but helpful in appreciating the applications of the present invention.

The inclusion of non-color, spatial information into profiles is disclosed in U.S. Patent Application Ser. No. 08/709, 487 filed Sep. 6, 1996 by Hultgren et al. and incorporated by reference herein in its entirety for background information. Spatial information can be represented, for instance, by private spatial tags under the ICC recommendations. The spatial tags should include information as to which class the particular characteristic function belongs, i.e. modulation transfer functions, one-dimensional noise power spectra, two-dimensional noise power spectra (referred to in this application as "noise masks"), or one-dimensional noise variance grey-level dependency LUTs. In the case of scanners, a tag should be included to designate the number of dots per inch (DPI) scanned during image acquisition. The tagged format should also include information sufficient to identify both the relevant units of spatial frequency and the dimensionality of the characteristic functions. Propagation of characteristic functions is calculated within the context of a model based image processing system.

The spatial tags of interest for the present invention include one-dimensional noise variance LUTs describing grey-level dependency of noise, and two-dimensional noise masks, describing the two-dimensional frequency dependency of the noise. These characteristic functions, and their formatted counterparts as spatial tags in a spatial device profile, can be used as part of a noise reduction image processing system, as for example described in the aforementioned U.S. patent application Ser. No. 08/440,639, and in U.S. patent application Ser. No. 08/966,140 filed Nov. 7, 1997 by Wober et al., both incorporated by reference in their entirety for supplemental background information which is non-essential but helpful in appreciating the applications of the present invention.

Application Ser. No. '639 discloses a process and system for removing noise from an image represented by an image signal by first noise modeling an image signal source to generate both noise masks and lookup table values characteristic of noise within each channel, and then applying the noise masks and LUT values to the image signal for noise removal. The image is first captured as an electronic image signal by the image signal source, then represented by a pyramid image representation whereby each successive level of the pyramid is constructed from direct current (DC) values of the previous level, and each level of the pyramid corresponds to a different frequency band of the image signal. A Wiener variant filter using DCT transforms is used to filter DCT coefficients at each level. The image is restored with reduced noise by replacing DC values with next level inverse discrete cosine transform (IDCT) coefficients, then performing an IDCT on the results.

Application Ser. No. '140 discloses a method and system for structuring an image which corresponds to an original array of pixels, as a forward discrete even cosine transform pyramid having a predetermined number of levels where each level is associated with a different DCT frequency band, includes, respectively, the steps or functionality of: partitioning the original array into blocks of overlapped pixels; taking a DCT of each block of overlapped pixels to generate blocks of first level DCT coefficients forming a first level of the DCT pyramid; storing the first level of the DCT pyramid; selecting and storing at least one of the first level DCT coefficients of each block of first level DCT coefficients into a first temporary array; partitioning the first temporary array into blocks of overlapped coefficients; and taking a DCT of each block of overlapped coefficients of the first temporary array to generate blocks of second level DCT coefficients forming a second level of the DCT pyramid. Additional levels can be created by repeating the previous steps.

At times an image can be acquired by a digital processing system but no device profile describing the spatial characteristics of the device is available. When the source device through which the image has passed is unknown, or no device profile is available, then accurate reproduction of the image to a destination device, such as a printer, is uncertain. Values must be estimated for the unknown or incomplete spatial information so that the reproduced image will vary as little as possible from the original image.

SUMMARY OF THE INVENTION

It is a primary object of the present invention to estimate the noise related spatial characteristics of an input device, i.e., how the noise introduced by the device varies over spatial frequency and grey-level, when measurements of these spatial characteristics are not available in a previously constructed device profile. This and other objects of the invention will become apparent to those of ordinary skill in the art from the following detailed description when read in conjunction with the accompanying drawings and appended claims.

Estimating spatial noise characteristics associated with an image acquired from an digital image acquisition device with unknown spatial noise characteristics is accomplished by a method, or system, which: provides predetermined default spatial noise characteristic information of the digital image acquisition device; gathers user information related to the spatial noise characteristics of the digital image acquisition device; gathers, from the acquired image, image data related to the spatial noise characteristics of the digital image acquisition device; generates replacement data in response to the user information and the image data; and updates the predetermined default spatial noise characteristic information with the replacement data.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

A first preferred embodiment of the present invention involves the generation of look-up tables of noise variance values (i.e., one-dimensional vectors of floating point values) occurring at particular grey-levels in the various luminance and chrominance bands of an image, then inserting those LUTs into appropriate spatial profile tags which approximate the grey-level-dependency of the noise variance of an unknown acquisition device which produced the subject image. A second preferred embodiment of the present invention involves the generation of a noise mask (i.e., a two-dimensional matrix of values) corresponding to the average power of the noise blocks of the image at a set of spatial frequencies, and then inserting the noise mask into an appropriate spatial profile tag which approximates the frequency-dependence of the noise power of the unknown image acquisition device which produced the subject image.

The present invention is directed towards estimating "unknown" or incomplete spatial noise characteristics of a device from the available image. The term "unknown" in this application is defined as not known to the image processing system (rather than not being known to the user). For instance, a new scanner may be delivered to the user who will scan an image into the image processing system. However, the particular brand or model of scanner may be so new that the image processing system may not yet have any spatial profile describing the noise introduced by the scanner, i.e. although the scanner brand and/or model is known to the user, it's characteristics remain "unknown" to the image processing system.

The use of spatial profiles as a way of writing out device spatial noise characteristics, and for transferring these spatial noise characteristics throughout an image processing system, is exemplary and non-limiting, i.e. the estimated noise information can be transferred between components of the image processing system by any known methods or apparatus. Also, although the present invention is directed towards estimation of upstream device spatial noise characteristics from an available image, the same principles can be readily applied by those of ordinary skill in the art to other device characteristics such as, but not limited to, modulation transfer functions, scanner DPI data, and color transformations.

Figure 1:
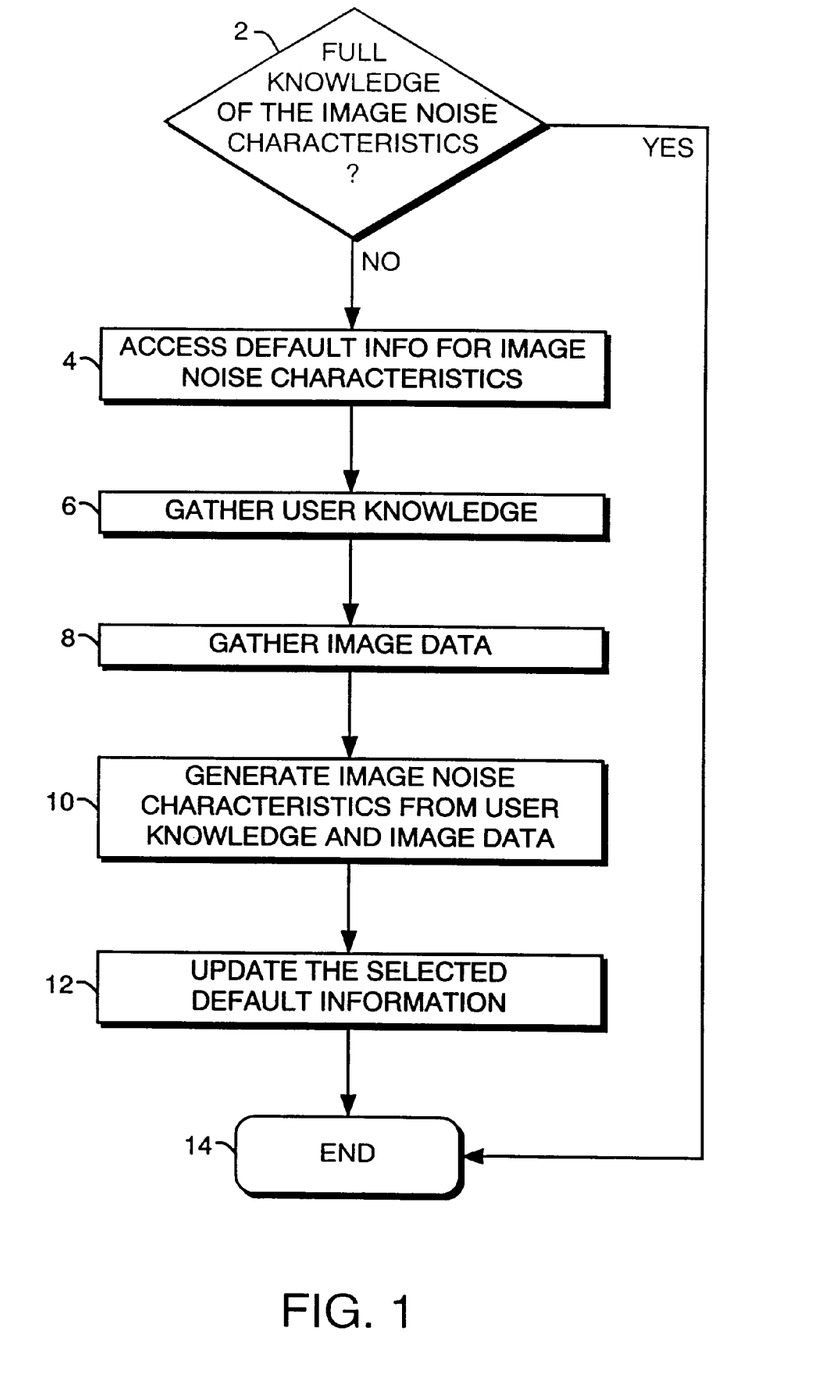
FIG. 1 is a flowchart diagram of a preferred method which operates in accordance with the principles of the invention.

The three parts to the inventive method for estimating unknown grey-level dependence of device noise from a digital image output by the device as depicted in FIG. 1 are: (1) gathering statistics about the noise in the image; (2) estimating the grey-level dependency of the noise by interpolating a function F between grey-level specific minimum variances; and (3) modifying the function F to adjust for the width of the noise distribution in the image.

Figure 2A:
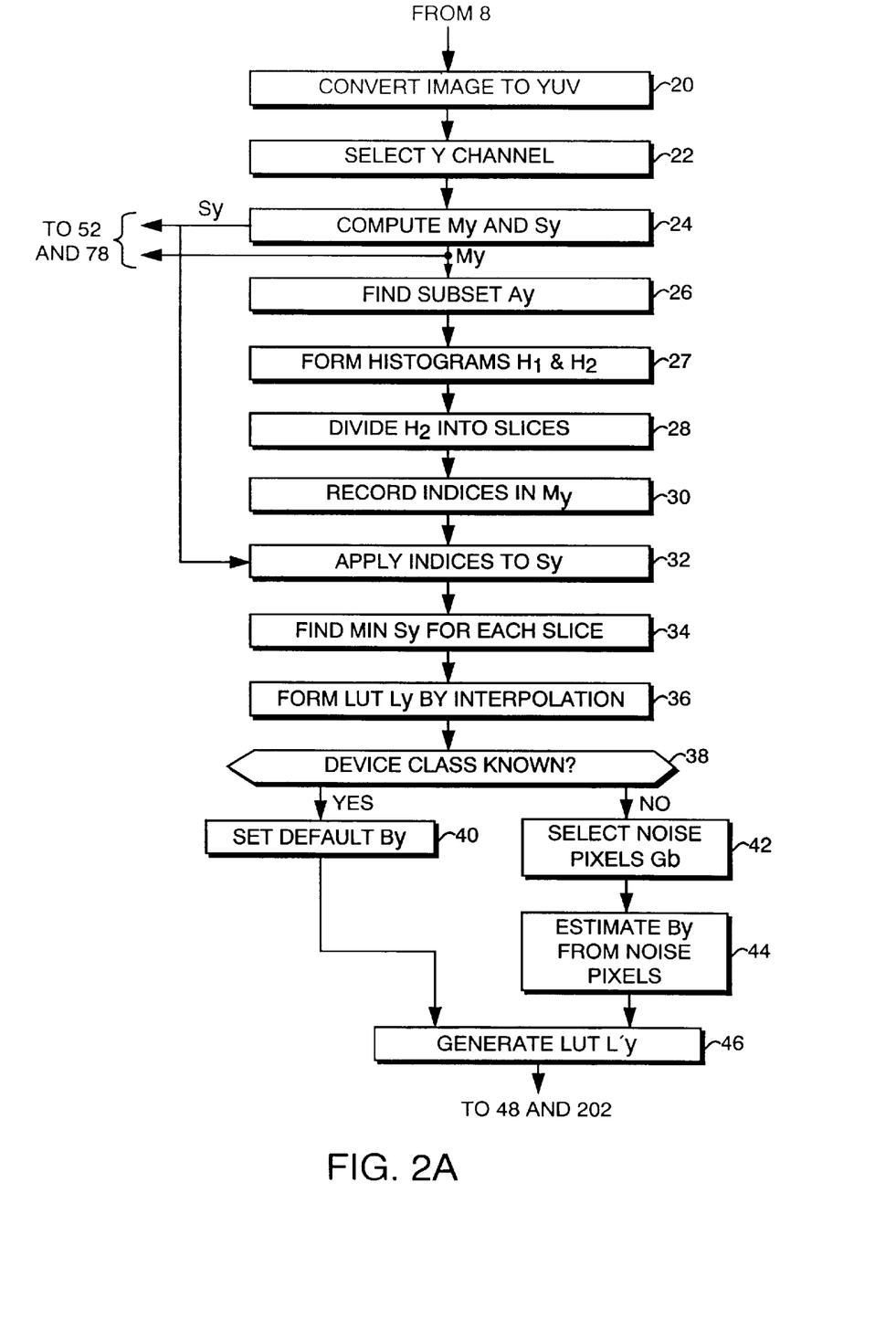
FIG. 2A is a flowchart diagram of a preferred subroutine of FIG. 1 for generating a look-up table (LUT) of noise variance values corresponding to particular grey-levels in a luminance band of an image, using image data and user knowledge.
Figure 2B:
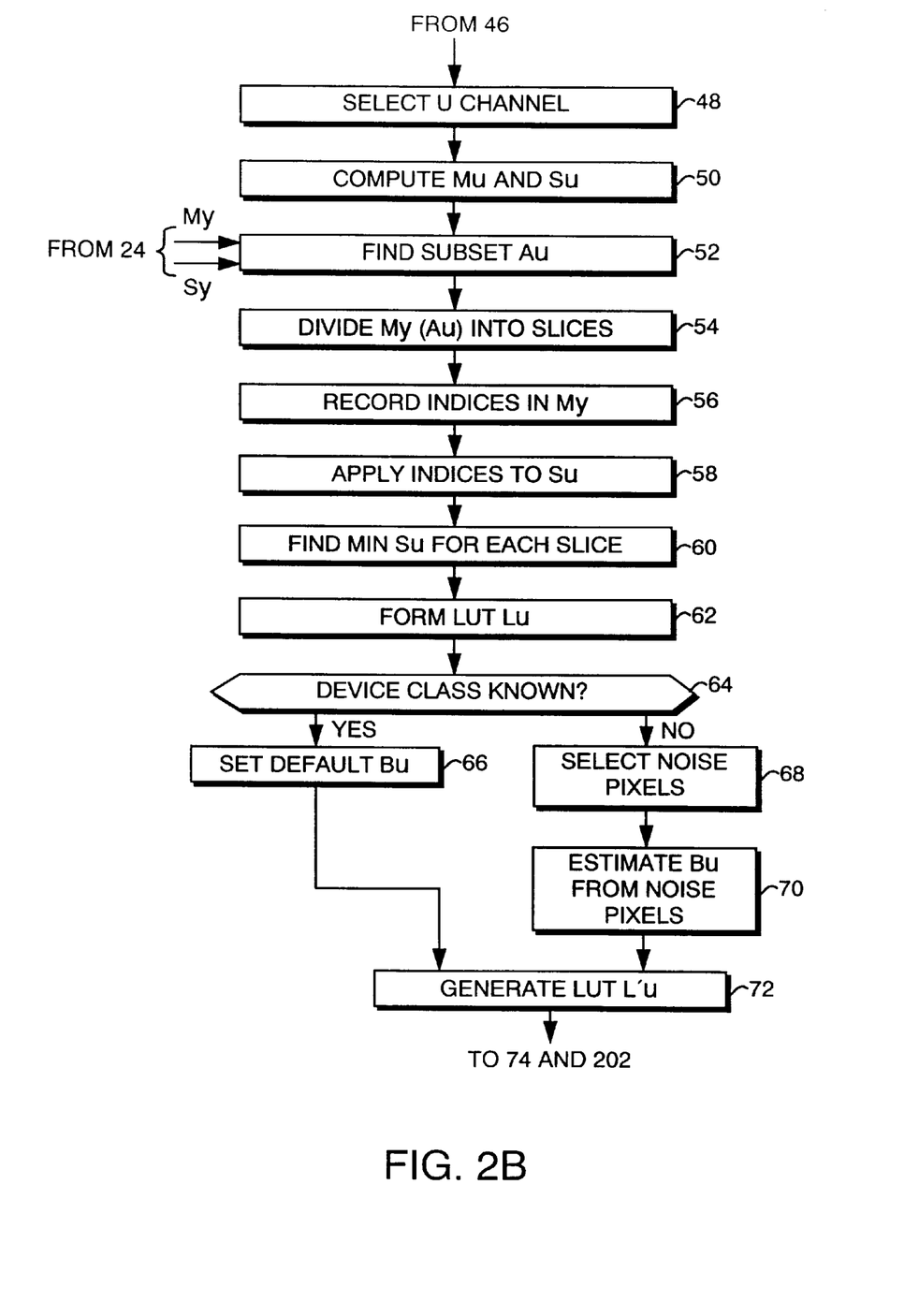
FIG. 2B is a flowchart diagram of a preferred subroutine of FIG. 1 for generating a LUT of noise variance values corresponding to particular grey-levels in a first chrominance band of the image using image data and user knowledge.
Figure 2C:
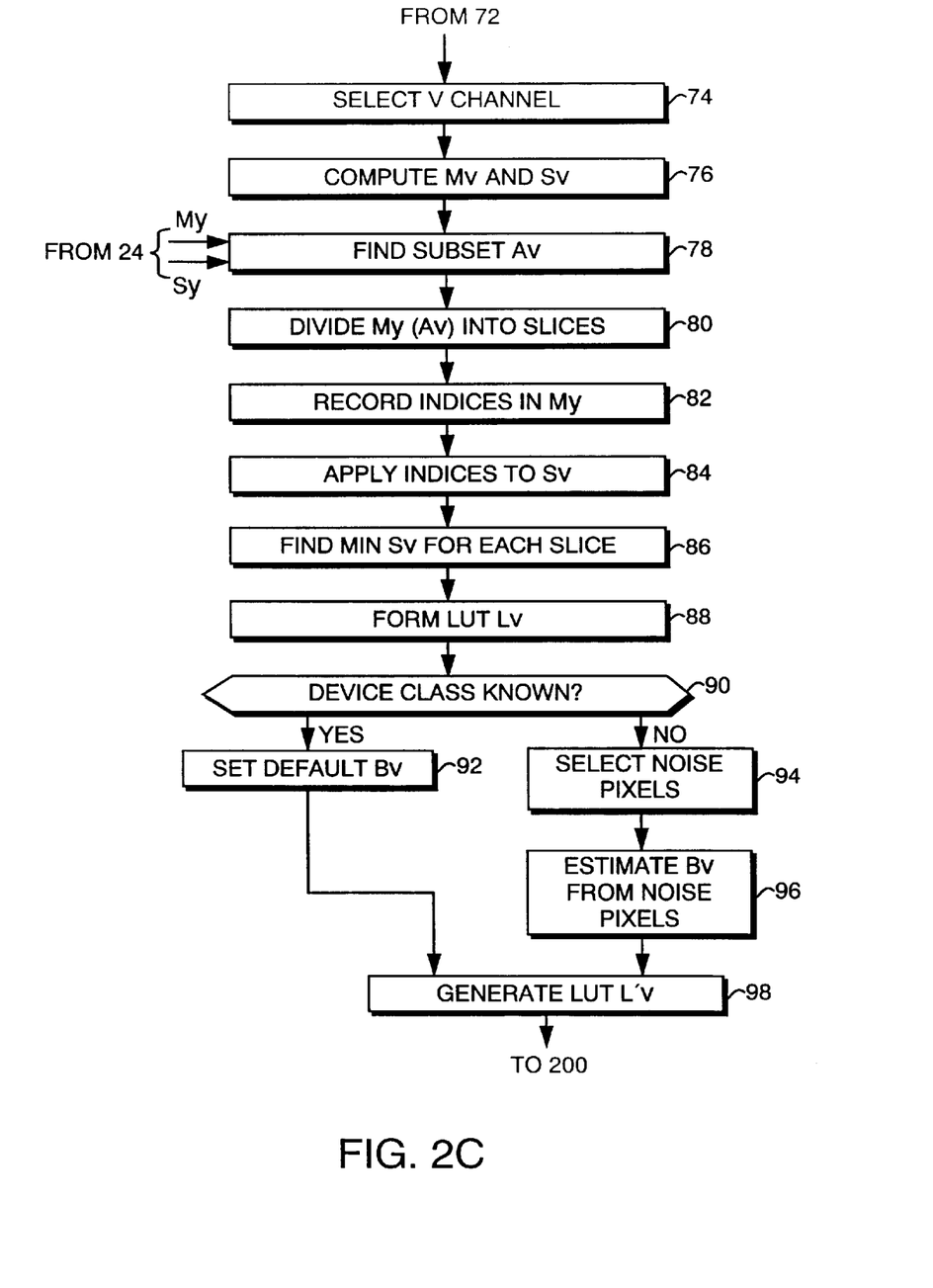
FIG. 2C is a flowchart diagram of a preferred subroutine of FIG. 1 for generating a LUT of noise variance values corresponding to particular grey-levels in a second chrominance band of the image using image data and user knowledge.

The above method, when expanded for estimating the unknown frequency dependence of device noise from a digital image output by the device, includes, (4) selecting all "noise-only" blocks (or regions if non-block oriented methods of FIGS. 2B or 2C are used) from the image using the function F computed in (3) above, and (5) averaging the two-dimensional power spectra of these blocks (or regions) together to obtain an estimate of the two-dimensional power spectrum of the noise.

LUT Generation

In FIG. 1, box 2 queries whether full knowledge associated with selected tags of a spatial device profile of the image is available. Full knowledge is defined as complete information of the selected spatial profile tags, which in this case includes one or more pyramid level noise tags and a frequency domain power spectrum tag.

If full knowledge of the spatial device profile tags associated with the image is available as queried in box 2, then the process ends in box 14. However, if any information of the selected spatial tags is incomplete or missing, then default spatial device profile tags are substituted as in box 4. The default tags are most likely predetermined and accessed from memory, although the default tag information could conceivably be provided by an operator. These default tags relate to a worst case scenario where no knowledge is available for any of the selected tags, so the default tags represent values which can be used to approximate any type of image acquisition device. For instance, an average of frequency domain power spectra of the noise of a large number of image acquisition devices from all classes (e.g. scanners, digital cameras, etc.) may be used as the default value of the frequency domain spectrum of the noise in an image acquired from an unknown image acquisition device.

Figure 5:
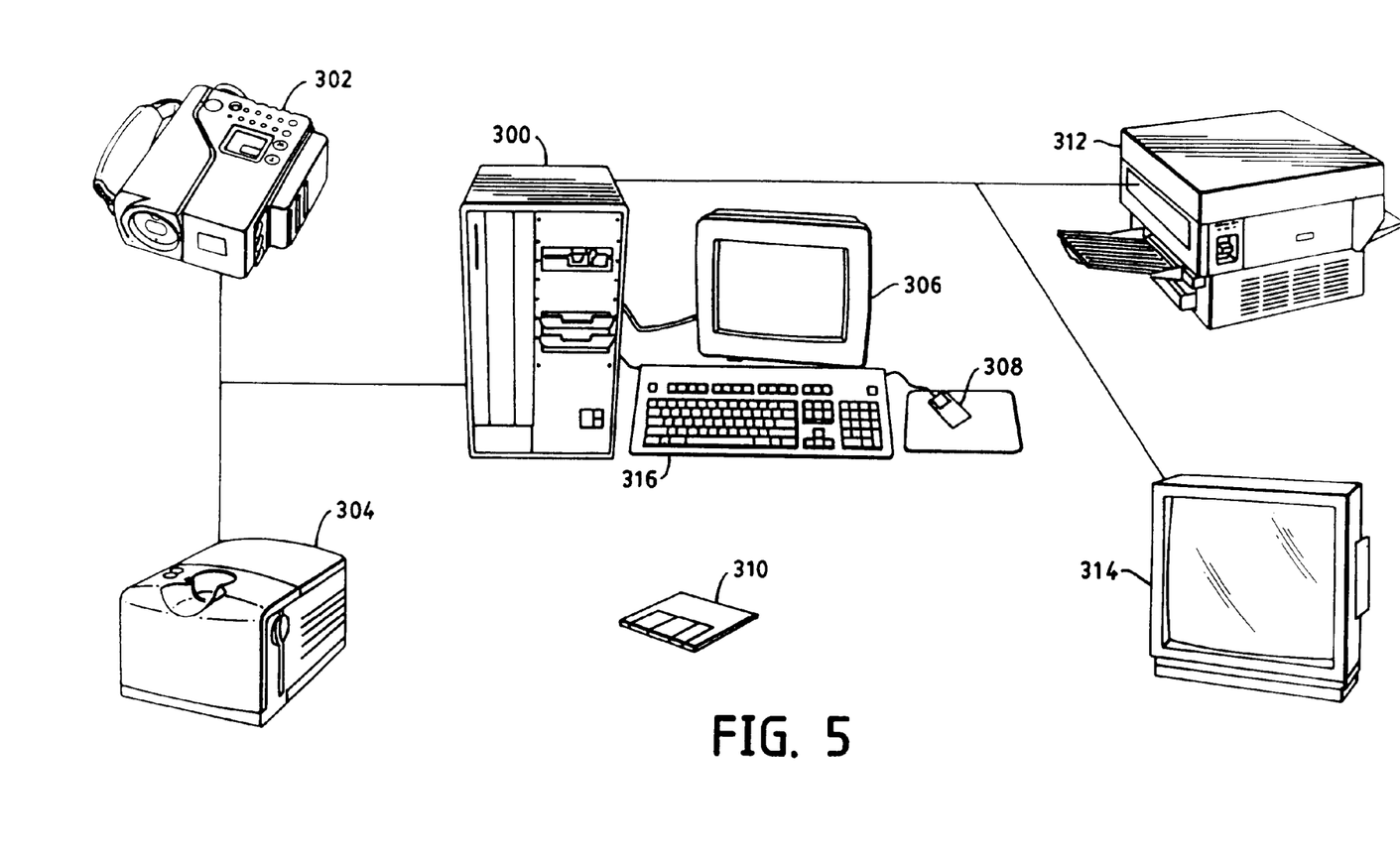
FIG. 5 is a flowchart diagram of a system which operates in accordance with the principles of the invention.

User information (i.e. information known to the user which affects the selected spatial profile tags) is gathered in box 6 through the use of peripherals such as the monitor 306, keyboard 316 and mouse 308 depicted by the system of FIG. 5.

Specifically, the user is queried on the monitor 306 as to his or her knowledge which affects the selected spatial profile tags. For example, the user may know that the source device was a scanner and not a digital still camera or video camcorder. Other examples of user information include: was the image previously compressed and decompressed; was the image previously sharpened; was the image previously resized (interpolated up or down). All this information is stored for future use.

In box 8, data embedded in the image which affects the selected spatial profile tags is identified and also stored in memory. In box 10, the computer 300 processes the user supplied information of box 6 and the image data gathered in box 8 into a format which is compatible with the selected spatial profile tags. Finally, in box 12 the default spatial profile tags are updated with the formatted tag information from box 10 to generate an updated spatial device profile which most closely matches the known and estimated spatial characteristics of the image acquisition device which produced the subject image. In this example, the updated tags include noise LUT information relating to noise variance values at particular grey-levels and/or two-dimensional matrices containing noise power spectrum values relating to the spatial frequency dependence of the noise.

The present example processes spatial device profile tag data for an image signal in YUV device-independent color space having one luminance (Y) and two chrominance (U,V) channels. The algorithm can be implemented in any color space and can include any number of bands or channels. It is understood that only spatial information is being analyzed, processed and estimated in each channel. Specifically, FIG. 2A outlines the process of generating the selected spatial tags corresponding to luminance channel Y; FIG. 2B outlines the process of generating the selected spatial tags corresponding to the first chrominance channel U; and FIG. 2C outlines the process of generating the selected spatial tags corresponding to the second chrominance channel V.

Figure 3A:
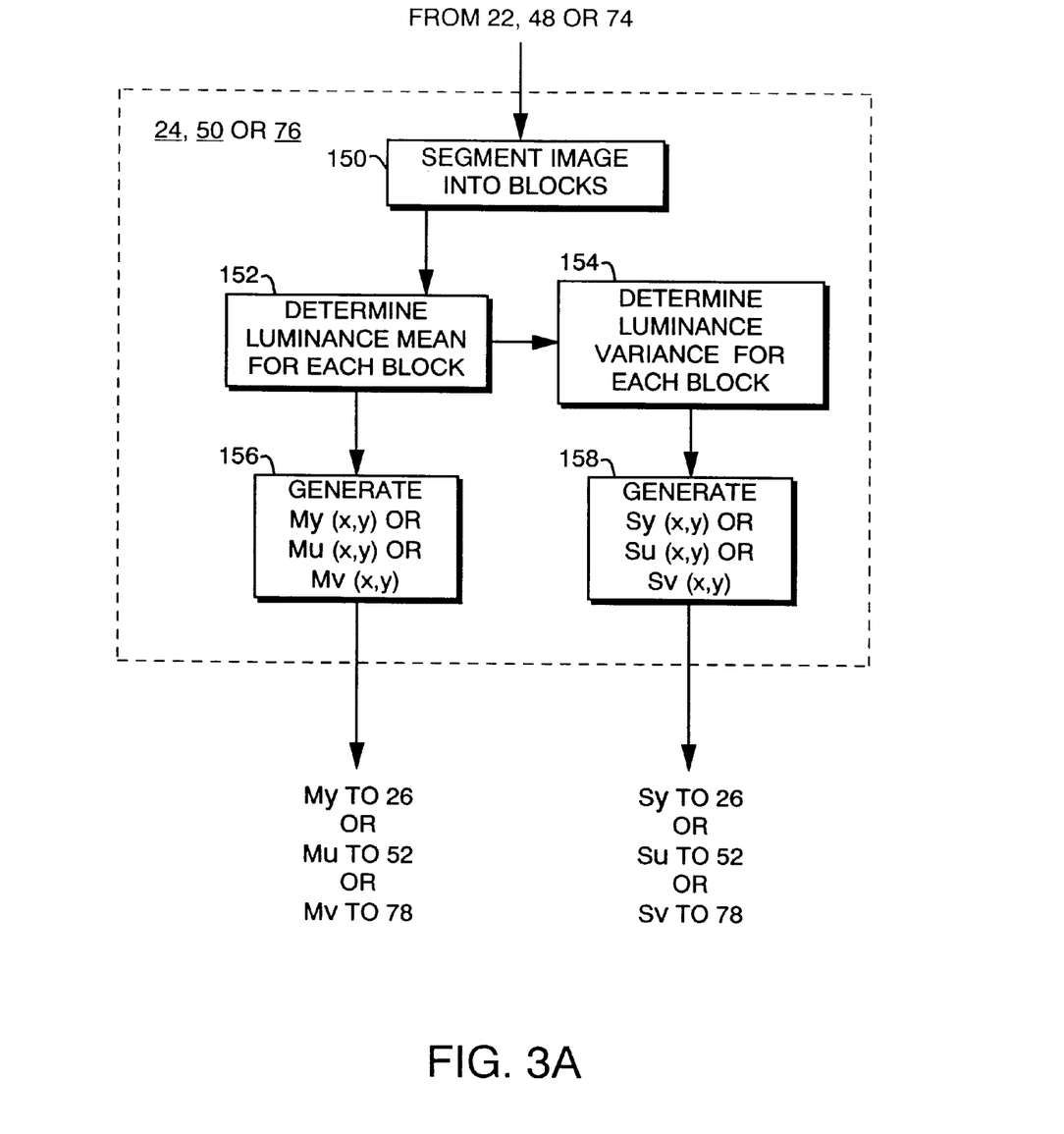
FIG. 3A is a flowchart diagram of steps used for generating, in FIGS. 2A, 2B and 2C, both an array of mean luminance values and an array of luminance variance values for any given channel, when the image is represented in the spatial domain.
Figure 3B:
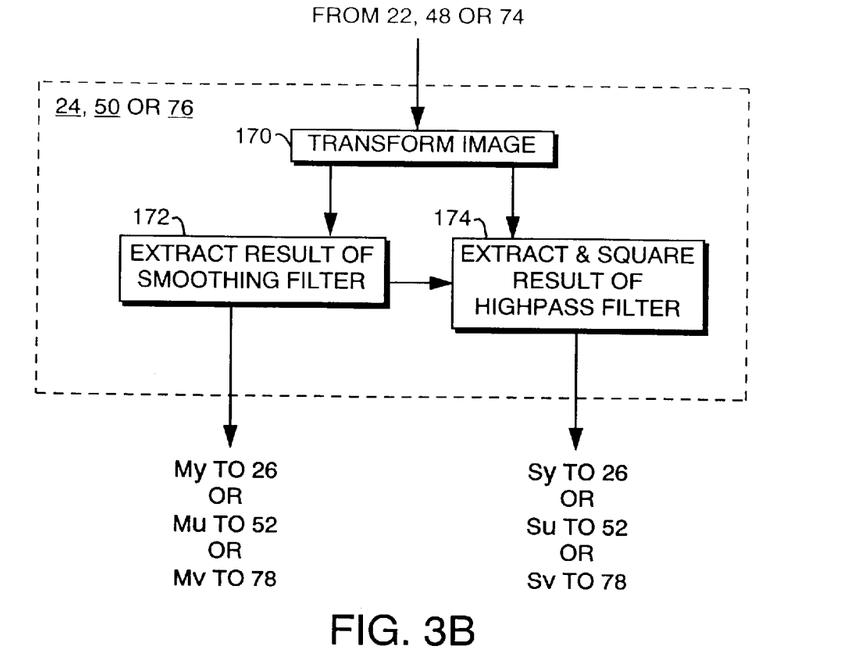
FIG. 3B is a flowchart diagram of steps used for generating, in FIGS. 2A, 2B and 2C, both an array of mean luminance values and an array of luminance variance values for any given channel by transforming the image to the wavelet domain.
Figure 3C:
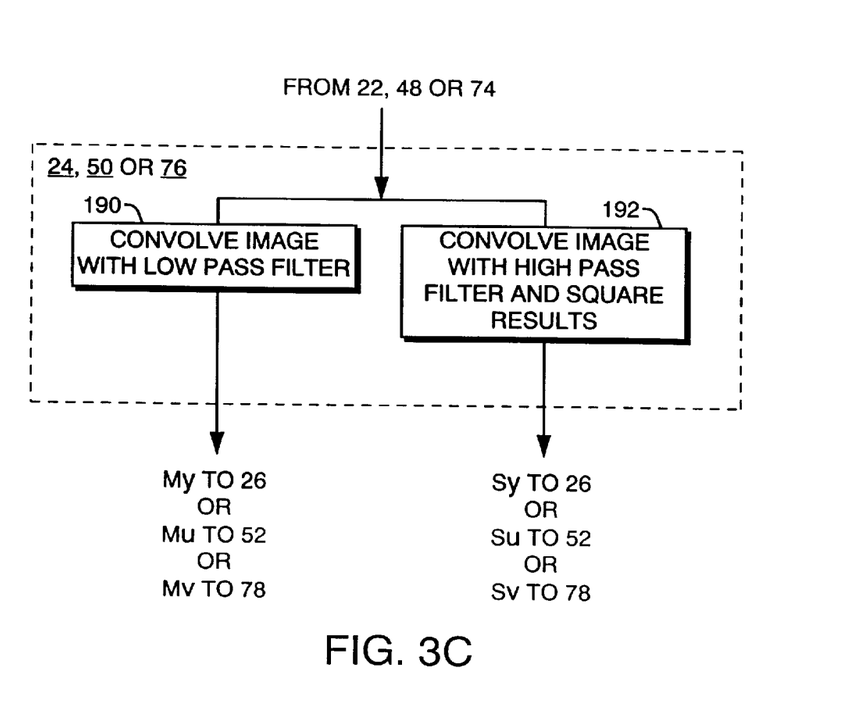
FIG. 3C is a flowchart diagram of steps used for generating, in FIGS. 2A, 2B and 2C, both an array of mean luminance values and an array of luminance variance values for any given channel by convolving the image with a low and a high pass filter.

A digital image is spatially represented as I(x,y) for pixels located on a rectangular axis where $0 \leq x \leq (xdim-1)$ and $0 \leq y \leq (ydim-1)$. The quantity xdim is defined as the number of columns in the image, whereas the quantity ydim is defined as the number of rows in the image. In FIG. 2A processing of the luminance channel Y is facilitated by converting the image I(x,y) in box 20 to YUV device-independent color space. Channel Y is selected for processing in box 22, and arrays $M_Y(x,y)$ and $S_Y(x,y)$ of local image statistics are computed in box 24. $M_Y(x,y)$ is an array of mean luminance values $\mu$, and $S_Y(x,y)$ is an array of luminance variance values $\sigma^2$ where in one preferred embodiment each of the mean and variance values corresponds to a different N×N pixel block of the image I(x,y), N being an integer. There are three different alternative embodiments for computing $M_Y(x,y)$ and $S_Y(x,y)$ in box 24 as illustrated by the examples of FIGS. 3A, 3B and 3C. FIG. 3A involves segmenting the image into N×N pixel blocks; FIG. 3B involves convolving the image with a pair of orthogonal quadrature mirror filters (one lowpass and one highpass); and FIG. 3C involves convolving the image with a pair of general-purpose (not necessarily orthogonal) highpass and lowpass filters.

In box 150 of FIG. 3A, the image I(x,y) is segmented into N×N blocks of pixels which can be either overlapped or non-overlapped. Overlapping adjacent pixel blocks by a factor of N/2 is preferred. A luminance mean $\mu$ is calculated for each pixel block of the image in box 152 by taking the mean of all the pixels in each block. For instance, if N=8, the mean luminance value $\mu$ for a given 8×8 pixel block is determined by adding the luminance values of each of the 64 pixels in the block, then dividing the sum by 64. In box 156 an array of mean luminance values $\mu$ is generated whereby each $\mu$ value represents an average for a separate 8×8 block of the image I(x,y). The array of mean luminance values is: $M_Y(x,y)$ for the luminance channel Y, $M_U(x,y)$ for the first chrominance channel U; and $M_V(x,y)$ for the second chrominance channel V. In box 154 the luminance variance $\sigma^2$ for each pixel block is determined by summing the squared differences between each pixel value of the block and the block mean $\mu$, then dividing the sum by the number of pixels in the block. Then in box 158, the array of variance values $\sigma^2$ is generated whereby each $\sigma^2$ value represents a variance for a separate 8×8 block of the image I(x,y). The array of luminance variance values is: $S_Y(x,y)$ for the luminance channel Y; $S_U(x,y)$ for the first chrominance channel U; and $S_V(x,y)$ for the second chrominance channel V. Note that all arrays M and S are low resolution (smaller) than I(x,y). There is one pixel in M and S for every N×N block of pixels in I(x,y).

In FIG. 3B, the image is transformed in box 170 by the first stage of a discrete wavelet transform; the algorithm is equivalent to two matrix multiplications or four convolutions with one dimensional orthogonal quadrature mirror filters (one lowpass and one highpass), followed by decimation by one-half (see Numerical Recipes in C, Second Edition, Cambridge University Press, 1992, pp. 592–595). For an R×R pixel image, this procedure results in a new R×R image consisting of four R/2×R/2 quadrants, LL, HH, HL, and LH. The LL (low-low) quadrant is extracted and stored as the mean luminance array in box 172. The array of mean luminance values is: $M_Y(x,y)$ for the luminance channel Y; $M_U(x,y)$ for the first chrominance channel U; and $M_V(x,y)$ for the second chrominance channel V. The HH (high-high) quadrant is extracted and squared in box 174, and then stored as the variance array. The array of luminance variance values is: $S_Y(x,y)$ for the luminance channel Y; $S_U(x,y)$ for the first chrominance channel U; and $S_V(x,y)$ for the second chrominance channel V.

In FIG. 3C, the lowpass and highpass filters are more general in the sense that they are not necessarily orthogonal. The image I(x,y) is convolved with the lowpass filter in box 190 to yield the luminance mean array of average luminance mean values $\mu$. The array of mean luminance values is: $M_Y(x,y)$ for the luminance channel Y; $M_U(x,y)$ for the first chrominance channel U; and $M_V(x,y)$ for the second chrominance channel V. The image I(x,y) is also convolved in box 192 with the highpass filter, then the resultant values are squared to yield the array of luminance variance values $\sigma^2$. The array of luminance variance values is: $S_Y(x,y)$ for the luminance channel Y; $S_U(x,y)$ for the first chrominance channel U; and $S_V(x,y)$ for the second chrominance channel V. Convolution in image processing is known as a filtering procedure where two discrete signals in the spatial domain are point-by-point multiplied, and the products are summed over appropriate limits. The lowpass filtering of an image is called smoothing, defined as the process for softening the edges where there is some change in luminance of the image, while decreasing high frequency components. Sharpening occurs from highpass filtering and is defined as the process of enhancing blurry images, particularly by emphasizing high frequency components which highlight the edges.

After one of the three subroutines of FIGS. 3A, 3B or 3C is completed in box 24 of FIG. 2A, values of $M_Y(x,y)$ are chosen in box 26 within an acceptable grey-level range falling between $Y_{min}$ and $Y_{max}$ (as defined below). In other words, a subset $A_Y$ of mean luminance values is generated to satisfy the condition $$Y_{min} \leq M_Y(A_Y) \leq Y_{max} \qquad (1)$$

where:
$Y_{min} = Y_1 + 3\sigma_1$;
$Y_{max} = Y_2 - 3\sigma_2$;
$Y_1$=Y value obtained from color transforming a (0,0,0) device space triplet (i.e. black) to a device-independent YUV color space;
$Y_2$=Y value obtained from color transforming a (255,255, 255) device space triplet (i.e. white) to a device-independent YUV color space;
$\sigma_1$=maximum noise standard deviation expected at low grey-levels; and
$\sigma_2$=maximum noise standard deviation expected at high grey-levels.

Note that a two-dimensional image represented by the mean luminance array M(x,y) can be written as a vector $\overline{M}(A)$ where the index A into the vector is defined by y*xdim+x. The vector M may include only a subset of the points in the image which satisfy the predetermined condition of equation (1). For example, the set of points $M_Y(A_Y)$ excludes values associated with parts of the image I(x,y) where the thresholds $Y_{min}$ and $Y_{max}$ are exceeded. This thresholding restriction lessens the effect of clipping on statistical estimates.

In box 27 two histograms are computed. The first histogram $H_1$ is a histogram of $M_Y(A_Y)$, where each bin is one grey-level wide so that indices equal grey-levels. This histogram records the number of elements of $M_Y(A_Y)$ at each grey-level. The second histogram $H_2$ plots the cumulative number of $M_Y(A_Y)$ values accumulating up to each grey-level from $H_1$. In other words, for $H_2$ the number of pixels at grey-level 50 equals the total pixel count of all pixels having a grey-level less than or equal to 50. The cumulative histogram $H_2$ is then divided into slices in box 28 so that each slice contains an equal number of pixels of $M_Y(A_Y)$. For the present example, $H_2$ is divided into 20 grey-level specific slices by letting slice i be bounded on the left and right by the $k_b$ and $k_t$ percentiles of $H_2$ where for i=1, $k_b$=0 and $k_t$=5 (designating the 5th percentile). The positions in the image corresponding to each slice i are then recorded as sets of indices as follows.

In box 30, indices or positions in $M_Y(A_Y)$ are recorded for each of 20 subsets $A^i_Y$ where i=1, 2 ... 20, and the union of all 20 subsets is the set $A_Y$. The subsets $A^i_Y$ define the positions in each grey-level slice i. The indices $A^i_Y$ are computed so that $$(Y_{min}+b) \leq M(A^i_Y) \leq (Y_{min}+t) \qquad (2)$$

where b and t are the (1 grey-level wide) bins of $H_2$ corresponding to the $k_b$ and $k_t$ boundaries of grey-level slice i, and $Y_{min}$ is as previously defined for equation (1). Slice i is bounded on the bottom by the grey-level $(Y_{min}+b)$ and the percentile $k_b$, and bounded on the top by the grey-level $(Y_{min}+t)$ and the percentile $k_t$. The process continues by setting i=i+1, b=t, $k_b$=$k_t$, $k_t$ =$k_t$+5, and t equal to the new index of $H_2$ which corresponds to the percentile $k_t$. This is repeated for each slice, until $k_t$=100.

In box 32, the set of indices $A^i_Y$ is applied to the luminance variance array $S_Y(x,y)$ so that $S_Y(A^i_Y)$ for $1 \leq i \leq 20$ represents sets of grey-level dependent 10 variances from pixel blocks with mean grey-level values given by $M_Y(A^i_Y)$. In box 34 the following statistics are computed, for each of the 20 slices (i=1, 2 ... 20)

$$T^i_{Y1} = \min\{S_Y(A^i_Y) > 0\} \qquad (3)$$

$$T^i_{Y2} = \operatorname{mean} M_Y(A^i_Y) \qquad (4)$$

where $T_{Y1}{}^i$ and $T_{Y2}{}^i$ form the basis of the grey-level dependent noise LUT to be 15 constructed next.

A function, implemented as a LUT $L_Y$, is generated in box 36 by interpolating between the grey-level dependent minima $T_{Y1}{}^i$. This is accomplished by a least squares fit of $T_{Y1}{}^i$ and $T_{Y2}{}^i$ (i=1 ... 20) to a functional form of a curve appropriate for the input space. For example, the form $a_0 e^{a_1 Y} + a_2$ (where $a_0 \leq 0$, $a_1 \leq 0$, and $a_2$ is unconstrained) is used if this form attains lower squared error than a least squares linear fit. The minimum and maximum of the resultant $L_Y$ are limited to the minimum and maximum respectively of $T^i_{Y1}$ over all i.

$L_Y$ estimates the grey-level dependency of the noise, but passes through the minimum of the noise distribution at each grey-level (points of minimum variance) rather than passing through the mean of the noise distribution at each grey-level as desired. Now, a new LUT $L_Y'$ is derived from $L_Y$ which passes as closely as possible through the mean of the noise distribution at each grey-level. $L_Y'$ is defined to be a linear function of $L_Y$:

$$L_Y' = b_0(L_Y - \min(L_Y)) + \min(L_Y) + b_1 \qquad (5)$$

where the coefficients of the linear function, $b_0$ and $b_1$, are designated by the set $B_Y=(b_0, b_1)$. By default, $B_Y$ is set to (1.3,1.54) for a Y band. These represent average values determined from all image acquisition devices for which data is available. Box 38 in FIG. 2A determines whether the device class is known. If the input device class is known (e.g. the user has told the system that the device is in the camera class vs. the scanner class), then the default $B_Y$ is set in box 40 as the average value for the appropriate device class. The default $B_Y$ may be adequate if the noise of future devices is expected to closely follow the devices averaged in the default sample. If this is not the case, $B_Y$ is estimated in boxes 42 and 44. Box 42 distinguishes pixel blocks $G_b$ containing only noise from pixel blocks containing signal as well, and then box 44 estimates $B_Y$ by finding that $B_Y$ which expresses the best linear transformation of the LUT $L_Y$ to the center of the distribution of noise-only pixel blocks $G_b$.

In box 42 an edge detector is applied to the input image $I(x,y)$ to identify those points around which there is appreciable luminance activity. The output of the edge detector is binarized. Consideration is limited to large uniform regions of the image $I(x,y)$ by setting to 1 (in a zeroed image buffer $I_2(x,y)$) those points P which are at least 5 pixels away from an edge point, and then additionally setting to 1 all those points Q within 4 pixels of each point P. At this point, $I_2(x,y)$ is equal to 1 at all points which are not edges.

In a zeroed buffer $M_3(x,y)$, which is the same size as $M_Y(x,y)$, all pixel blocks are set to 1 for which all the corresponding $N^2$ points are equal to 1 in $I_2(x,y)$. This step reduces the resolution of the noise point position buffer from full resolution to low (block) resolution.

Next, subtract out the effect of grey-level dependence from $S_Y(x,y)$ to form a grey-level independent (gli) array as follows:

$$S_{y,gli}(x,y) = S_y(x,y) - L_Y(M_Y(x,y)) \qquad (6)$$

where the notation $L_Y(M_y(x,y))$ means to apply the LUT $L_Y$ to every point of the image $M_y(x,y)$, creating a new image. Noise blocks $G_b$ are then defined as the set of indices corresponding to positions $(x,y)$ for which $Y_{min} < M_Y(x,y) < Y_{max}$, $M_3(x,y)=1$, and $S_{y,gli}(x,y) < T_H$, a given threshold. In box 44, the additive term $b_1$ is set equal to the median of all points in $S_{y,gli}(G_b)$ $G_b^{low}$ defines the subset of $G_b$ for which $Y_{min} < M_y(x,y) <$ median$(M_y(x,y))$. The multiplicative factor $b_0$, which makes the desired output LUT $L'_Y$ go through the median of the set of variances $S_Y(G_b^{low})$, is determined by minimizing $$E = |n/z - 0.5| \qquad (7)$$

where: n is the number of elements in the vector $\overline{X}$ (which is a subset of $G_b^{low}$) for which the condition $S_y(G_b^{low}) < L'_Y\{M_y(G_b^{low})\}$ holds; and z is the number of elements in $G_b^{low}$.

At this point we have available the coefficients $(b_0, b_1)$ of the linear function to generate $L'_Y$ from $L_Y$. The generation is accomplished by setting $L'_Y(y) = b_0(L_Y(y) - \min(L_Y)) + \min(L_Y) + b_1$ for all y (grey-levels) from $Y_1$ to $Y_2$ (defined in equation 1).

After processing is complete in the luminance channel Y, the first chrominance channel U is processed according to the steps of FIG. 2B by first selecting channel U in box 48. Arrays $M_U(x,y)$ and $S_U(x,y)$ of local image statistics are computed in box 50. $M_U(x,y)$ is an array of mean luminance values $\mu$, and $S_U(x,y)$ is an array of luminance variance values $\sigma^2$ where in a preferred embodiment each of the mean and variance values corresponds to a different N×N pixel block of the image $I(x,y)$, N being an integer. There are several different processes for computing $M_U(x,y)$ and $S_U(x,y)$ in box 50 as illustrated by the examples of FIGS. 3A, 3B and 3C and explained above for processing the luminance channel Y in accordance with FIG. 2A. FIG. 3A involves segmenting the image into N×N blocks; FIG. 3B involves convolution with a pair of orthogonal highpass and lowpass filters; and FIG. 3C involves convolution with general purpose (not necessarily orthogonal) highpass and lowpass filters.

After one of the three subroutines of FIGS. 3A, 3B or 3C is completed in box 50 of FIG. 2B, values of $M_U(x,y)$ are chosen in box 52 within an acceptable grey-level range falling between $Y_{min}$ and $Y_{max}$. In other words, a subset $A_U$ of mean luminance values is generated to satisfy the condition $$Y_{min} \leq M_Y(A_U) \leq Y_{max} \text{ and } U_{min} \leq M_U(A_U) \leq U_{max} \qquad (8)$$

where:
$Y_{min} = Y_1 + 3\sigma_1$;
$Y_{max} = Y_2 - 3\sigma_2$;
$U_{min} = -30 * 2^{J-8}$
$U_{max} = +30 * 2^{J-8}$
$Y_1 = Y$ value obtained from color transforming the (0,0,0) device space triplet (i.e. black) to device-independent YUV space;
$Y_2 = Y$ value obtained from transforming the (255,255,255) device space triplet (i.e. white) to device-independent YUV space;
$\sigma_1$ = maximum noise standard deviation expected at low grey-levels;
$\sigma_2$ = maximum noise standard deviation expected at high grey-levels; and
J = number of bits in dynamic range of Y in device-independent color space.

Note that a two-dimensional image represented by the mean luminance array $M_U(x,y)$ can be written as a vector $\overline{M}(A)$ where the index A into the vector is defined by y*xdim+x. The vector M may include only a subset of the points in the image which satisfy the predetermined condition of equation (8). For example, the set of points $M_U(A_U)$ excludes values associated with parts of the image $I(x,y)$ where the thresholds $Y_{min}$, $Y_{max}$, $U_{min}$, or $U_{max}$, are exceeded. This thresholding restriction lessens the effect of clipping on statistical estimates.

In box 54 two histograms are computed. The first histogram $H_{U1}$ is a histogram of $M_Y(A_U)$, where each bin is one grey-level wide so that indices equal grey-levels. This histogram records the number of elements of $M_Y(A_U)$ at each grey-level. The second histogram $H_{U2}$ plots the cumulative number of $M_Y(A_U)$ values accumulating up to each grey-level from $H_{U1}$. In other words, for $H_{U2}$ the number of pixels at grey-level 50 equals the total pixel count of all pixels having a grey-level less than or equal to 50. The cumulative histogram $H_{U2}$ is then divided into slices in box 54 so that each slice contains an equal number of pixels. For the present example, $H_{U2}$ is divided into 20 grey-level specific slices by letting slice i be bounded on the left and right by the $k_b$ and $k_t$ percentiles of $H_{U2}$ where for i=1, $k_b$=0 and $k_t$=5 (designating the 5th percentile).

In box 56, indices or positions in $M_Y(A_U)$ are recorded for each of 20 subsets $A^i_U$ where i=1, 2 ... 20. The subsets $A^i_U$ are subsets of $A_U$, and define the positions in each grey-level slice i. The indices $A^i_U$ are computed so that $$(Y_{min} + b) \leq M_Y(A^i_U) \leq (Y_{min} + t) \qquad (9)$$

where b and t are the (1grey-level wide) bins of $H_{U2}$ corresponding to the $k_b$ and $k_t$ boundaries of grey-level slice i, and $Y_{min}$ is as previously defined for equation (8).

Slice i is bounded on the bottom by the grey-level ($Y_{min}$+b) and the percentile $k_b$, and bounded on the top by the grey-level ($Y_{min}$+t) and the percentile $k_t$. The process continues by setting i=i+1, b=t, $k_b$=$k_t$, $k_t$=$k_t$+5, and t equal to the new index of $H_{U2}$ which corresponds to the percentile $k_t$. This is repeated for each slice, until $k_t$=100.

In box 58, the set of indices $A^i_U$ is applied to the luminance variance array $S_U(x,y)$ so that $S_U(A_U^i)$ for $1 \leq i \leq 20$ represents sets of grey-level dependent variances from pixel blocks with mean grey-level values given by $M_Y(A_U^i)$. The following statistics are collected for each of the 20 slices (i=1, 2 ... 20)

$$T_{U1}^i = \min\{S_U(A_U^i) > 0\} \quad (10)$$

$$T_{U2}^i \text{ mean } M_Y(A_U^i) \quad (11)$$

where $T_{U1}^i$ and $T_{U2}^i$ form the basis of the grey-level dependent noise LUT to be constructed next.

A function, implemented as a LUT $L_U$, is generated in box 62 by interpolating between the grey-level dependent minima $T_{U1}^i$. This is accomplished by a least squares fit of $T_{U1}^i$ and $T_{U2}^i$ to a functional form of a curve appropriate for the input space. For example, the form $a_0 e^{a_1 Y} + a_2$ (where $a_0 \geq 0$, $a_1 \leq 0$, and $a_2$ is unconstrained) is used if this form attains lower squared error than a least squares linear fit. The minimum and maximum of the resultant $L_U$ are limited to the minimum and maximum respectively of $T^i_{U1}$ over all i.

$L_U$ estimates the grey-level dependency of the U chrominance noise (at zero U), but passes through the minimum of the U chrominance noise distribution at each grey-level (points of minimum variance) rather than passing through the mean of the U chrominance noise distribution at each grey-level as desired. Now, a new LUT $L_U'$ is derived from $L_U$ which passes as closely as possible through the mean of the noise distribution at each grey-level. $L_U'$ is defined to be a linear function of $L_U$:

$$L_U' = b_0(L_U - \min(L_U)) + \min(L_U) + b_1 \quad (12)$$

where the coefficients of the linear function, $b_0$ and $b_1$, are designated by the set $B_U = (b_0, b_1)$. By default, $B_U = (b_0, b_1)$ is set to (1.5,0) for a U or V band. These represent average values determined from all image acquisition devices for which data is available. Box 64 in FIG. 2B determines whether the device class is known. If the input device class is known (e.g. camera class vs. scanner class as told to the system by the user), then the default $B_U$ is set in box 66 as the average value for the appropriate device class. The default $B_U$ may be adequate if the noise of future devices is expected to closely follow the devices averaged in the default sample. If this is not the case, $B_U$ is estimated in boxes 68 and 70. Box 68 distinguishes pixel blocks $G_b$ containing only noise from pixel blocks containing signal as well, and then box 70 estimates B by finding the linear transformation of $L_U$ which places the LUT $L'_U$ closest to the center of the distribution of noise-only pixel blocks $G_b$.

In box 68 an edge detector is applied to the input image I(x,y) to identify those points around which there is appreciable luminance activity. The output of the edge detector is binarized. Consideration is limited to large uniform regions of the image I(x,y) by setting to 1 (in a zeroed image buffer $I_2(x,y)$) those points P which are at least 5 pixels away from an edge point, and then additionally setting to 1 all those points Q within 4 pixels of each point P. In a zeroed buffer $M_3(x,y)$, which is the same size as $M_U(x,y)$, all pixel blocks are set to 1 for which all the corresponding $N^2$ points are equal to 1 in $I_2(x,y)$. This step reduces the resolution of the noise point position buffer $I_2(x,y)$ from full resolution to low resolution.

Next, subtract out the effect of grey-level dependence from $S_U(x,y)$ to form a grey-level independent array as follows:

$$S_{U,glt}(x,y) = S_U(x,y) - L_U(M_Y(x,y)) \quad (13)$$

where the notation $L_U(M_Y(x,y))$ means to apply the LUT $L_U$ to every point of the image $M_Y(x,y)$, creating a new image. Noise blocks $G_b$ are defined as the set of indices for which the following conditions hold: $Y_{min} < M_Y(G_b) < Y_{max}$, $M_3(G_b) = 1$, and $S_{U,glt}(G_b) < T_H$, a given threshold. In box 70, the additive term $b_1$ is set equal to the median of all points of the set $S_{U,glt}(G_b)$.

$G_b^{low}$ defines the subset of $G_b$ for which $Y_{min} < M_Y(x,y) < \text{median}(M_Y(x,y))$.

The multiplicative factor $b_0$ which makes $L_U'$ go through the median of the set $S_U(G_b^{low})$ of these blocks is determined by minimizing $$E = |n/z - 0.5| \quad (14)$$

where: n is the number of elements in the vector X (which is a subset of $G_b^{low}$) for which the condition $S_U(G_b^{low}) < L_U'\{M_Y(G_b^{low})\}$ holds; and z is the number of elements in $G_b^{low}$.

At this point we have available the coefficients ($b_0$, $b_1$) of the linear function to generate $L_U'$ from $L_U$. The generation is accomplished in box 72 by setting $L_U'(y) = b_0(L_U(y) - \min(L_U)) + \min(L_U) + b_1$ for all y (grey-levels) from $Y_1$ to $Y_2$ (defined in equation 1).

After processing is complete in the first chrominance channel U, the second chrominance channel V is processed according to the steps of FIG. 2C by first selecting channel V in box 74. Arrays $M_V(x,y)$ and $S_V(x,y)$ of local image statistics are computed in box 76. $M_V(x,y)$ is an array of mean luminance values $\mu$, and $S_V(x,y)$ is an array of luminance variance values $\sigma^2$ where in a preferred embodiment each of the mean and variance values corresponds to a different N×N pixel block of the image I(x,y), N being an integer. There are several different processes for computing $M_V(x,y)$ and $S_V(x,y)$ in box 76 as illustrated by the examples of FIGS. 3A, 3B and 3C and explained above for processing the luminance channel Y in accordance with FIG. 2A. FIG. 3A involves segmenting the image into N×N blocks; FIG. 3B involves convolving the image with a pair of orthogonal filters (highpass and lowpass); and FIG. 3C involves convolving the image with a pair of filters, one highpass and one lowpass, which are not necessarily orthogonal.

After one of the three subroutines of FIGS. 3A, 3B or 3C is completed in box 76 of FIG. 2C, values of $M_Y(x,y)$ are chosen in box 78 within an acceptable grey-level range falling between $Y_{min}$ and $Y_{max}$ and acceptable V chrominance range falling between $V_{min}$ and $V_{max}$. In other words, a subset $A_V$ of mean luminance values is generated to satisfy the condition $$Y_{min} \leq M_Y(A_V) \leq Y_{max} \text{ and } V_{min} \leq M_V(A_V) \leq V_{max} \quad (15)$$

where:
$Y_{min} = Y_1 + 3\sigma_1$;
$Y_{max} = Y_2 - 3\sigma_2$;
$V_{min} = -30 * 2^{J-8}$
$V_{max} = +30 * 2^{J-8}$
$Y_1$=Y value obtained from (0,0,0) device space triplet (i.e. black);
$Y_2$=Y value obtained from (255,255,255) device space triplet (i.e. white);
$\sigma_1$=maximum noise standard deviation expected at low grey-levels;

$\sigma_2$=maximum noise standard deviation expected at high grey-levels; and

J=number of bits in dynamic range of Y in device-independent color space.

Note that a two-dimensional image represented by the mean luminance array $M_Y(x,y)$ can be written as a vector $\overline{M}(A)$ where the index A into the vector is defined by y*xdim+x. The vector $\overline{M}$ may include only a subset of the points in the image which satisfy the predetermined condition of equation (15). For example, the set of points $M_Y(A_V)$ excludes values associated with parts of the image I(x,y) where the thresholds $Y_{min}$, $Y_{max}$, $V_{min}$, or $V_{max}$ are exceeded. This thresholding restriction lessens the effect of clipping on statistical estimates.

In box 80 two histograms are computed. The first histogram $H_{V1}$ is a histogram of $M_Y(A_V)$, where each bin is one grey-level wide so that indices equal grey-levels. This histogram records the number of elements of $M_Y(A_V)$ at each grey-level. The second histogram $H_{V2}$ of $M_Y(A_V)$ plots the cumulative number of values accumulating up to each grey-level from $H_{V1}$. In other words, for $H_{V2}$ the number of pixels at grey-level 50 equals the total pixel count of all pixels having a grey-level less than or equal to 50. The cumulative histogram $H_{V2}$ is then divided into slices in box 80 so that each slice contains an equal number of pixels. For the present example, $H_{V2}$ is divided into 20 grey-level specific slices by letting slice i be bounded on the left and right by the $k_b$ and $k_t$ percentiles of $H_{V2}$ where for i=1, $k_b$=0 and $k_t$=5 (designating the 5th percentile).

In box 82, indices or positions in $M_Y(A_V)$ are recorded for each of 20 subsets $A^i_V$ where i=1, 2 ... 20. The subsets $A^i_V$ are subsets of $A_V$ and define the positions in each grey-level slice i. The indices $A^i_V$ are computed so that $$(Y_{min}+b) \leq M_Y(A_V^i) \leq (Y_{min}+t) \tag{16}$$

where b and t are the (1 grey-level wide) bins of $H_{V2}$ corresponding to the $k_b$ and $k_t$ boundaries of grey-level slice i, and $Y_{min}$ is as previously defined for equation (15). Slice i is bounded on the bottom by the grey-level ($Y_{min}$+b) and the percentile $k_b$, and bounded on the top by the grey-level ($Y_{min}$+t) and the percentile $k_t$. The process continues by setting i=i+1, b=t, $k_b$=$k_t$, $k_t$=$k_t$+5, and t equal to the new index of $H_{V2}$ which corresponds to the percentile $k_t$. This is repeated for each slice, until $k_t$=100.

In box 84, the set of indices $A^i_V$ is applied to the luminance variance array $S_V(x,y)$ so that $S_V(A_V^i)$ for $1 \leq i \leq 20$ represents sets of grey-level dependent variances from pixel blocks with mean grey-level values given by $M_Y(A_V^i)$. In box 60 the following statistics are computed for each of the 20 slices (i=1, 2 ... 20)

$$T_{V1}^i = \min\{S_V(A_V^i) > 0\} \tag{17}$$

$$T_{V2}^i = \text{mean } M_Y(A_V^i) \tag{18}$$

where $T_{V1}^i$ and $T_{V2}^i$ form the basis of the grey-level dependent noise LUT to be constructed next.

A function, implemented as a LUT $L_V$, is generated in box 88 by interpolating between the grey-level dependent minima $T_{V1}^i$. This is accomplished by a least squares fit of $T_{V1}^i$ and $T_{V2}^1$ to a functional form of a curve appropriate for the input space. For example, the form $a_0 e^{a_1 Y} + a_2$ (where $a_0 \geq 0$, $a_1 \leq 0$, and $a_2$ is unconstrained) is used if this form attains lower squared error than a least squares linear fit. The minimum and maximum of the resultant $L_V$ are limited to the minimum and maximum respectively of $T_{V1}^i$ over all i.

$L_V$ estimates the grey-level dependency of the V chrominance noise (at zero V), but passes through the minimum of the V noise distribution at each grey-level (points of minimum variance) rather than passing through the mean of the V noise distribution at each grey-level as desired. Now, a new LUT $L_V'$ is derived from $L_V$ which passes as closely as possible through the mean of the noise distribution at each grey-level. $L_V'$ is defined to be a linear function of $L_V$:

$$L_V' = b_0(L_V - \min(L_V)) + \min(L_V) + b_1 \tag{19}$$

where variables $b_0$ and $b_1$ are designated by the set $B_V = (b_0, b_1)$. By default, $B_V = (b_0, b_1)$ is set to (1.5,0) for a V band. These represent average values determined from all image acquisition devices for which data is available. Box 90 in FIG. 2C determines whether the device class is known. If the input device class is known (e.g. camera class vs. scanner class as told to the system by the user), then the default $B_V$ is set in box 92 as the average value for the appropriate device class. The default $B_V$ may be adequate if the noise of future devices is expected to closely follow the devices averaged in the default sample. If this is not the case, $B_V$ is estimated in boxes 94 and 96. Box 94 distinguishes pixel blocks $G_b$ containing only noise from pixel blocks containing signal as well, and then box 96 estimates $B_V$ by finding the linear transformation of the LUT $L_v$ which best places $L'_V$ near the center of the distribution of noise-only pixel blocks $G_b$.

In box 94 an edge detector is applied to the input image I(x,y) to identify those points around which there is appreciable luminance activity. The output of the edge detector is binarized. Consideration is limited to large uniform regions of the image I(x,y) by setting to 1 (in a zeroed image buffer $I_2(x,y)$) those points P which are at least 5 pixels away from an edge point, and then additionally marking all those points Q within 4 pixels of each point P. In a buffer $M_3(x,y)$, which is the same size as $M_Y(x,y)$, all pixel blocks are marked for which all the corresponding $N^2$ points are set to 1 in $I_2(x,y)$. This step reduces the resolution of the noise point position buffer $I_2(x,y)$ from full resolution to low resolution.

Next, subtract out the effect of grey-level dependence from $S_V(x,y)$ to form a grey-level independent array as follows:

$$S_{V,gli}(x,y) = S_V(x,y) - L_V(M_Y(x,y)) \tag{20}$$

where the notation $L_V(M_Y(x,y))$ means to apply the LUT $L_V$ to every point of the image $M_Y(x,y)$, creating a new image. Noise blocks $G_b$ are defined as the set of indices for which $Y_{min} < M_Y(x,y) < Y_{max}, M_3(x,y)=1$, and $S_{V,gli}(x,y) < T_H$, a given threshold. In box 96, the additive term $b_1$ is set equal to the median of all points of $S_{gli}(G_b)$.

$G_b^{low}$ defines the subset of $G_b$ for which $Y_{min} < M_Y(x,y) < \text{median}(M_Y(x,y))$. The multiplicative factor $b_0$ which makes $L_V'$ go through the median of the set $S_V(G_b^{low})$ of these blocks is determined by minimizing $$E = |n/z - 0.5| \tag{21}$$

where: n is the number of elements in the vector $\overline{X}$ (which is a subset of $G_b^{low}$) for which the condition $S_V(G_b^{low}) < L_V'\{M_Y(G_b^{low})\}$ holds; and z is the number of elements in $G_b^{low}$.

The coefficients ($b_0$, $b_1$) of the linear function are used to generate $L_V'$ from $L_V$. The generation is accomplished in box 98 by setting $L_V'(y) = b_0(L_V(y) - \min(L_V)) + \min(L_V) + b_1$ for all y (grey-levels) from $Y_1$ to $Y_2$ (defined in equation (15).

At this point, LUTs have been generated for each of the three channels in the current example so that the $i^{th}$ entry in each table is an estimate of the noise level in the image I(x,y) at a grey-level i in the corresponding channel. Specifically, $L_{Y}'$ has been determined for luminance channel Y, $L_{U}'$ has been determined for first chrominance channel U, and $L_{V}'$ has been determined for second chrominance channel V. In the preferred embodiment described hereinbefore, $L_{Y}'$, $L_{U}'$ and $L_{V}'$ each replace default values in a spatial profile of noise characteristics related to the unknown image acquisition device.

The above algorithm describes but one preferred way of generating noise characteristic LUTs for particular grey-levels. Other known LUT generation methods can also be used in keeping with the principles of the invention.

Noise Mask Generation

Figure 4:
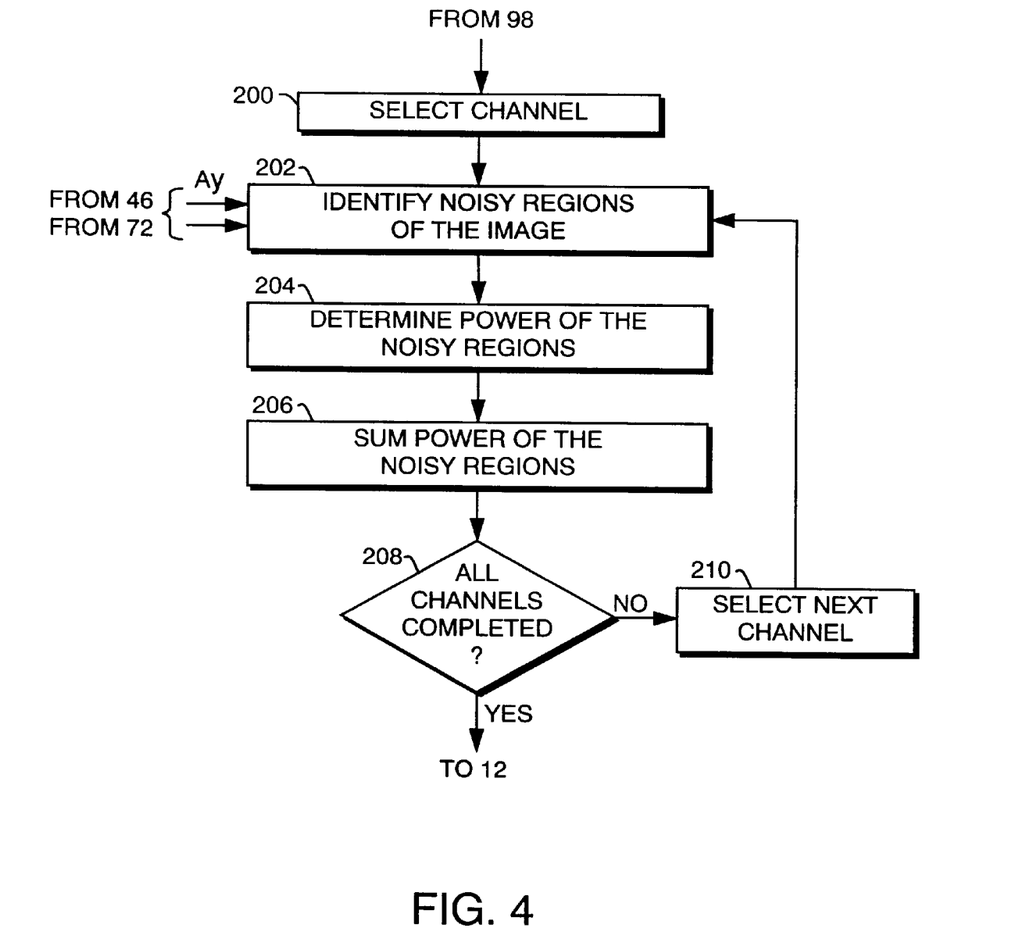
FIG. 4 is a flowchart diagram of a preferred method for generating a noise mask corresponding to an average of the power of the noise blocks of the image following the generation of LUTs as in FIGS. 3A, 3B and 3C.

FIG. 4 is a flowchart diagram of a preferred method for generating a noise mask (two-dimensional matrix of values describing frequency dependence of the noise) for an image of unknown origin. This method uses noise LUTs for each channel generated as above from variance values $S_{Y}(x,y)$, $S_{U}(x,y)$, $S_{V}(x,y)$ and mean values $M_{Y}(x,y)$, $M_{U}(x,y)$, $M_{V}(x,y)$. (We use the block-oriented method of generating image statistics as the preferred example below, though as discussed previously, S and M can be generated using non-block oriented methods such as convolution and wavelet.) The luminance channel Y is selected in box 200, and noise-only blocks of the image are identified in box 202 as those block positions (x,y) which satisfy:

$$L_{Y}'(Y_{max}) \leq S_{Y}(x,y) \leq L_{Y}'(M_{Y}(x,y)) \quad (22)$$

and $$Y_{min} < M_{Y}(x,y) < Y_{max} \quad (23)$$

For all positions (x,y) of the image I(x,y) which satisfy the conditions of equations (22) and (23), the frequency domain power $C^{Y}_{x,y}(f_i,f_j)$ of the noisy region (x,y) is computed in box 204 as:

$$C^{Y}_{x,y}(f_i,f_j) = F(D)^2 \quad (24)$$

where $f_i, f_j = 0$ to $N-1$ for $N \times N$ blocks, the function F is either a discrete cosine, Fourier or wavelet transform and D is an $N \times N$ array which represents the noisy image block at position (x,y). The restrictions of equations (22) and (23) are applied to avoid using image blocks which a) may contain power other than noise, b) may be artificially uniform due to clipping, and c) have particularly low signal-to-noise ratio, thus indicating a possibility of signal contamination. In box 206 the power $C^{Y}_{x,y}$ of the noisy block is averaged with the power of all other noisy blocks by summing pointwise over all (x,y) for each frequency domain coefficient $(f_i,f_j)$ so that $P^{Y}(f_i,f_j) = \Sigma\Sigma C^{Y}_{x,y}(f_i,f_j)/W$ where the limits of the summation extend over all positions (x,y) satisfying (22) and (23) above and W is the number of noise blocks used in the summation. If all channels have not been processed, then the next channel, e.g. the first chrominance channel U, is selected and steps 202 through 208 are repeated, where $L_{Y}$ is replaced by $L_{U}$; $L_{Y}'$ is replaced with $L_{U}'$; $S_{Y}(x,y)$ is replaced with $S_{U}(x,y)$; $M_{Y}(x,y)$ remains $M_{Y}(x,y)$ and the power $C^{U}_{x,y}(f_i,f_j)$ of the noise block at position (x,y) in the U channel is averaged with the power of all other noise blocks at other positions (x,y) so that $P^{U}(f_i,f_j) = \Sigma\Sigma C^{U}_{x,y}(f_i,f_j)/W$. Similarly, when the second chrominance channel V is selected, steps 202 through 208 are repeated and $L_{Y}$ is replaced by $L_{V}$; $L_{Y}'$ replaced with $L_{V}'$; $S_{Y}(x,y)$ is replaced with $S_{V}(x,y)$; $M_{Y}(x,y)$ remains $M_{Y}(x,y)$; and the power $C^{V}_{x,y}(f_i,f_j)$ of the noise block at position (x,y) in the V channel is averaged with the power of all other noise blocks at other positions (x,y) so that $P^{V}(f_i,f_j) = \Sigma\Sigma C^{V}_{x,y}(f_i,f_j)/W$. At this point in the preferred embodiment, the default spatial tags of the noise power are replaced with the values of $P^{Y}$, $P^{U}$ and $P^{V}$.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. Estimating spatial noise characteristics associated with an image acquired from a digital image acquisition device having unknown spatial noise characteristics, by a method comprising the steps of:

providing predetermined default values for the spatial noise characteristics of the digital image acquisition device;

gathering information related to the spatial noise characteristics of the digital image acquisition device;

generating replacement data in response to said gathered information; and updating said predetermined default spatial noise characteristics associated with the digital image acquisition device with said replacement data.

2. The method of claim 1 wherein the step of gathering information comprises gathering user information related to the spatial noise characteristics of the digital image acquisition device.

3. The method of claim 2 wherein said user information relates to compression, decompression, sharpening, interpolation, input device class, input device resolution, scan dots-per-inch and approximate noise levels.

4. The method of claim 1 wherein the step of gathering information comprises gathering, from the acquired image, image data related to the spatial noise characteristics of the digital image acquisition device.

5. The method of claim 4 wherein said image data relates to compression, decompression, sharpening, interpolation, input device class, input device resolution, scan dots-per-inch and approximate noise levels.

6. The method of claim 1 wherein the step of generating replacement data comprises producing the replacement data as luminance variance values occurring at predetermined grey-levels in each luminance and chrominance band of the acquired image.

7. The method of claim 6 wherein said luminance variance values are represented in look-up tables.

8. The method of claim 1 wherein the step of generating replacement data comprises producing the replacement data as average power of noise blocks in the acquired image.

9. The method of claim 8 wherein the average power of the noise blocks is represented in a frequency domain as a noise mask.

10. The method of claim 1 wherein the predetermined default values are established by averaging spatial noise characteristic information from a plurality of image acquisition devices.

11. In an image processing system, a method for generating noise tags of a spatial profile of an image acquisition device, the method comprising the steps of:

generating default values of the noise tags;

gathering user knowledge of spatial noise characteristics associated with the noise tags;

gathering image data, from an image acquired by the image acquisition device, related to the spatial noise characteristics associated with the noise tags;

generating replacement data in response to said user knowledge and said image data; and updating said default values of the noise tags associated with the image acquisition device with said replacement data.

12. The method of claim 11 wherein the step of generating replacement data comprises producing the replacement data as luminance variance values occurring at predetermined grey-levels in each luminance and chrominance band of the acquired image.

13. The method of claim 12 wherein said luminance variance values are represented in look-up tables.

14. The method of claim 11 wherein the step of generating replacement data comprises producing the replacement data as average frequency domain power of noise blocks in the acquired image.

15. The method of claim 14 wherein the average frequency domain power of the noise blocks is represented as a noise mask.

16. The method of claim 11 wherein said default values of the noise tags are established by averaging spatial noise characteristic information from a plurality of image acquisition devices.

17. The method of claim 11 wherein said user information relates to compression, decompression, sharpening, interpolation, input device class, input device resolution, scan dots-per-inch and approximate noise levels.

18. The method of claim 11 wherein said image data relates to compression, decompression, sharpening, interpolation, input device class, input device resolution, scan dots-per-inch and approximate noise levels.

19. A system for estimating spatial noise characteristics associated with an image acquired from a digital image acquisition device having unknown spatial noise characteristics, the system comprising:

means for providing predetermined default values of the spatial noise characteristics of the digital image acquisition device;

means for gathering information related to the spatial noise characteristics of the digital image acquisition device;

means for generating replacement data in response to said gathered information; and means for updating said predetermined default spatial noise characteristics associated with the digital image acquisition device with said replacement data.

20. The system of claim 19 wherein the means for gathering information comprises means for gathering user information related to the spatial noise characteristics of the digital image acquisition device.

21. The system of claim 20 wherein said user information relates to compression, decompression, sharpening, interpolation, input device class, input device resolution, scan dots-per-inch and approximate noise levels.

22. The system of claim 19 wherein the means for gathering information comprises means for gathering, from the acquired image, image data related to the spatial noise characteristics of the digital image acquisition device.

23. The system of claim 22 wherein said image data relates to compression, decompression, sharpening, interpolation, input device class, input device resolution, scan dots-per-inch and approximate noise levels.

24. The system of claim 19 wherein the means for generating replacement data comprises means for producing the replacement data as luminance variance values occurring at predetermined grey-levels in each luminance and chrominance band of the acquired image.

25. The system of claim 24 wherein said luminance variance values are represented in look-up tables.

26. The system of claim 19 wherein the means for generating replacement data comprises means for producing the replacement data as average power of noise blocks in the acquired image.

27. The system of claim 26 wherein the average power of the noise blocks is represented in a frequency domain as a noise mask.

28. The system of claim 19 wherein the predetermined default values are established by averaging spatial noise characteristic information from a plurality of image acquisition devices.

* * * * *